United States Patent

Weidmann et al.

(10) Patent No.: US 9,453,744 B2
(45) Date of Patent: Sep. 27, 2016

(54) MEASURING GRADUATION AND PHOTOELECTRIC POSITION MEASURING DEVICE HAVING THE SAME

(71) Applicant: DR. JOHANNES HEIDENHAIN GmbH, Traunreut (DE)

(72) Inventors: Josef Weidmann, Feichten a.d. Alz (DE); Peter Speckbacher, Kirchweidach (DE); Andrew Graham, Chieming (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/504,472

(22) Filed: Oct. 2, 2014

(65) Prior Publication Data

US 2015/0098094 A1  Apr. 9, 2015

(30) Foreign Application Priority Data

Oct. 7, 2013  (DE) ........................ 10 2013 220 190

(51) Int. Cl.
| | |
|---|---|
| *G01B 11/14* | (2006.01) |
| *G01D 5/347* | (2006.01) |
| *G01D 5/38* | (2006.01) |

(52) U.S. Cl.
CPC ........... *G01D 5/34707* (2013.01); *G01B 11/14* (2013.01); *G01D 5/38* (2013.01)

(58) Field of Classification Search
USPC ....... 356/614–622, 499, 496, 521, 305, 328, 356/334, 902
See application file for complete search history.

(56) References Cited

U.S. PATENT DOCUMENTS

| | | | | |
|---|---|---|---|---|
| 4,746,792 | A  * | 5/1988 | Dil ............................... | 356/499 |
| 6,285,455 | B1 * | 9/2001 | Shiraishi ...................... | 356/486 |
| 7,186,969 | B2 * | 3/2007 | Shimomura et al. .... | 250/231.13 |
| 7,312,878 | B2 * | 12/2007 | Speckbacher et al. ....... | 356/614 |
| 7,440,104 | B2 * | 10/2008 | Sato et al. .................... | 356/369 |
| 2007/0058173 | A1 | 3/2007 | Holzapfel | |
| 2009/0135435 | A1* | 5/2009 | Zwilling et al. .............. | 356/616 |
| 2013/0038804 | A1* | 2/2013 | Li et al. .......................... | 349/33 |

FOREIGN PATENT DOCUMENTS

| | | |
|---|---|---|
| DE | 4132941 C2 | 4/1993 |
| EP | 1106972 A1 | 6/2001 |
| EP | 1762828 A2 | 3/2007 |

* cited by examiner

*Primary Examiner* — Tri T Ton
(74) *Attorney, Agent, or Firm* — Leydig, Voit & Mayer, Ltd.

(57) ABSTRACT

A measuring graduation includes a phase grating for a photoelectric position measuring device for measuring positions in a first direction and in a second direction extending orthogonally to the first direction. The phase grating has a periodic array of grating elements in the first direction and in the second direction. The grating elements each have an outer contour that is formed by a continuous line which includes two mutually opposing first straight edges, two mutually opposing second straight edges extending perpendicularly to the first straight edges, and connecting lines extending between the first straight edges and the second straight edges. The connecting lines form an obtuse angle with the first straight edges and with the second straight edges.

11 Claims, 3 Drawing Sheets

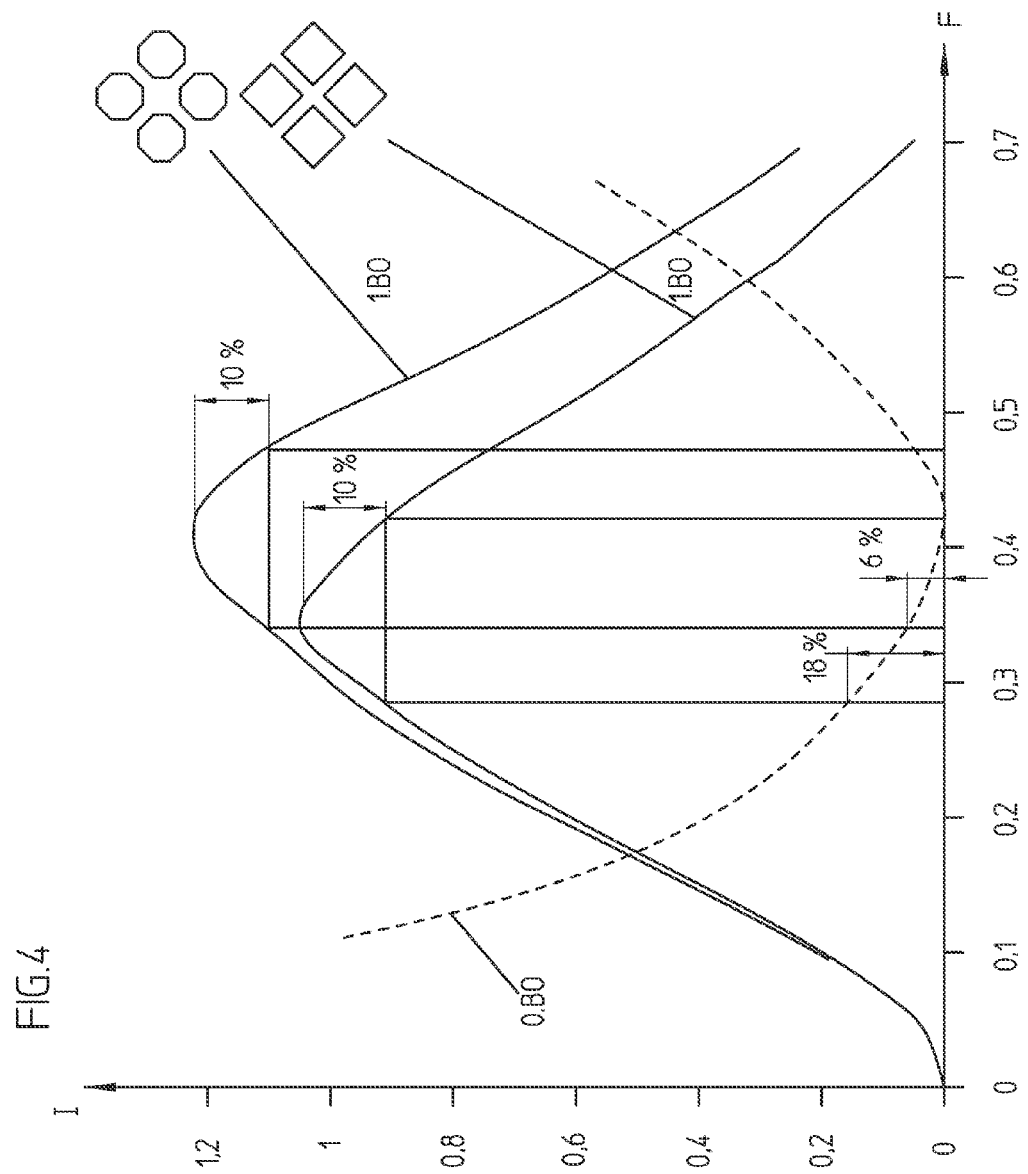

MEASURING GRADUATION AND PHOTOELECTRIC POSITION MEASURING DEVICE HAVING THE SAME

CROSS-REFERENCE TO PRIOR APPLICATION

Priority is claimed to German Patent Application No. DE 10 2013 220 190.7, filed on Oct. 7, 2013, the entire disclosure of which is hereby incorporated by reference herein.

FIELD

The present invention relates to a measuring graduation for a photoelectric position measuring device for measuring positions in a first direction and in a second direction extending orthogonally thereto, including a phase grating having a periodic array of grating elements in the first direction and in the second direction.

Measuring graduations of this kind are used as a scale for photoelectric position measuring devices that measure in two dimensions. To measure positions, a light beam is directed at the measuring graduation, and a first component beam is generated by diffraction at the measuring graduation that is made to interfere with another component beam.

The present invention also relates to a photoelectric position measuring device having a measuring graduation of this type. Photoelectric position measuring devices of this kind are used for measuring changes in the position of two objects that are movable relative to one another. The measuring graduation is scanned by a light beam, and the light beam modulated at the measuring graduation as a function of position is directed to a scanning unit which derives therefrom a measure of the instantaneous position of the scanning unit relative to the measuring graduation.

BACKGROUND

A measuring graduation and position measuring device of the species are known from the European Patent Application EP 1 106 972 A1. The measuring graduation is constituted of grating elements in the form of a periodic array of squares in a first direction and in a second direction, the squares forming a checkerboard pattern having 90° corners that are adjacent to one another.

Another measuring graduation and position measuring device of the species are known from the German Patent DE 4132941 C2. The measuring graduation is composed of a periodic array of squares in a first direction and in a second direction, the squares being configured to be mutually spaced apart and not contacting one another.

SUMMARY

In an embodiment, the present invention provides a measuring graduation includes a phase grating for a photoelectric position measuring device for measuring positions in a first direction and in a second direction extending orthogonally to the first direction. The phase grating has a periodic array of grating elements in the first direction and in the second direction. The grating elements each have an outer contour that is formed by a continuous line which includes two mutually opposing first straight edges, two mutually opposing second straight edges extending perpendicularly to the first straight edges, and connecting lines extending between the first straight edges and the second straight edges. The connecting lines form an obtuse angle with the first straight edges and with the second straight edges.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 shows the intensity profiles of the first order diffraction and of the zero order diffraction for a related-art measuring graduation and for a measuring graduation according to the present invention as a function of the surface area ratio of a grating element.

DETAILED DESCRIPTION

Figure 1:
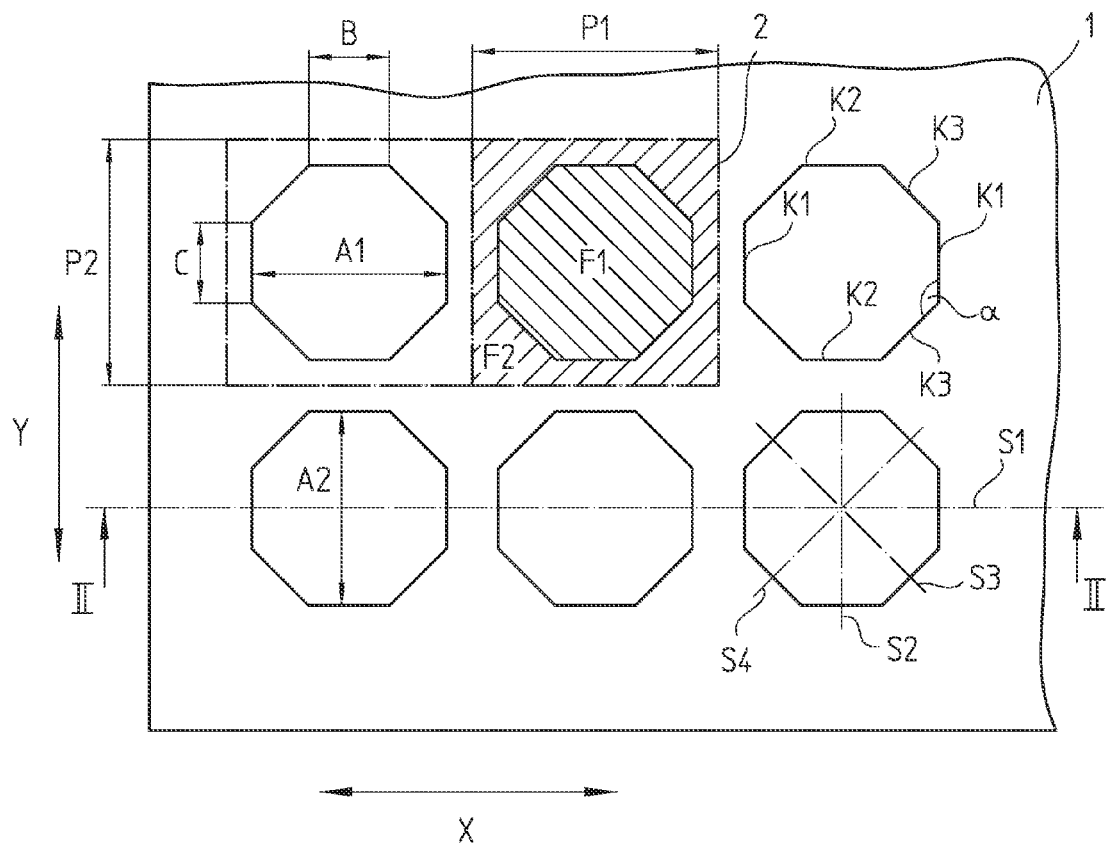
FIG. 1 shows a plan view of the measuring graduation in accordance with the present invention.

In an embodiment, the present invention provides a measuring graduation for a photoelectric position measuring device for measuring positions in a first direction and in a second direction extending orthogonally thereto, that is easy to manufacture and that will make possible a precise measuring of positions in the two measuring directions.

The measuring graduation according to an embodiment of the present invention includes a phase grating having a periodic array of grating elements in the first direction and in the second direction. The periodically arrayed grating elements each feature an outer contour that is formed by a continuous line that includes two mutually opposing first straight edges and two mutually opposing second straight edges extending perpendicularly thereto, as well as connecting lines, in each case between the first and second edges and each forming an obtuse angle.

The mentioned continuous line forms a continuous geometric figure in a plane defined by the first and the second direction.

The definition of an obtuse angle $\alpha$ is:

$$90° < \alpha < 180°.$$

The connecting lines form an obtuse angle between the first and second edges, respectively, these connecting lines each including a straight continuous line, and the respective edge forming the particular obtuse angle with this straight continuous line.

One of the grating elements is formed in each case by a raised reflecting surface and a reflecting surface region that is recessed therefrom, the recessed surface region surrounding the raised surface region. The height difference between these two reflecting surfaces is referred to as step height and, along with other parameters, such as wavelength and index of refraction, defines the resulting phase deviation of an incident light beam.

In accordance with an embodiment of the present invention, either the raised reflecting surface or the reflecting surface that is recessed therefrom of one grating element, respectively, features the outer contour according to the present invention.

The phase grating may be composed of two reflective layers that are mutually spaced apart orthogonally to the first and second direction and are configured on both sides of a transparent spacer layer. One of the two layers forms the raised surface, and the other of the two layers the recessed surface. The phase grating is particularly effective when the recessed surface is a continuous reflecting layer.

The phase grating is advantageously designed for suppressing the zero order diffraction. To this end, it is advantageous when the raised surface area percentage and the recessed surface area percentage of a grating element are selected to allow the same light intensities to be reflected. Forming the connecting lines as straight lines simplifies the manufacturing of the measuring graduation. It is also advantageous when all of the obtuse angles formed are identical, in particular are 135° angles.

It is also advantageous when the mutual spacing of the first edges corresponds to that of the second edges. A square having cut-off corners is thereby derived as a continuous line.

Particularly advantageous is the four-axis symmetrical embodiment of a grating element. In this context, the outer contour extends mirror symmetrically to a first axis of symmetry that extends orthogonally to the first edges, and mirror symmetrically to a second axis of symmetry that extends orthogonally to the second edges, and mirror symmetrically to a third axis of symmetry that extends at 45° to the first axis of symmetry, and mirror symmetrically to a fourth axis of symmetry that extends orthogonally to the third axis of symmetry.

A significant improvement in the diffraction properties over the related-art embodiments is already evident when the length of the second edges is 10% to 90% of the mutual spacing of the first edges, respectively, and the length of the first edges is likewise 10% to 90% of the mutual spacing of the second edges, respectively.

A further enhancement is achieved when the length of the second edges is 30% to 70% of the mutual spacing of the first edges, respectively, and the length of the first edges is 30% to 70% of the mutual spacing of the second edges, respectively. The mutual spacing defines the distance of the particular edges from one another.

With regard to using the measuring graduation in a position measuring device, it is advantageous when the first edges are oriented in parallel to one direction of the two measuring directions, and the second edges are oriented in parallel to the other direction of the two measuring directions, or when the first edges are angled 45° toward the first measuring direction, and the second edges are angled 45° toward the second measuring direction.

It is also an object of the present invention to provide a photoelectric position measuring device that will permit a precise measuring of positions.

On the one hand, the present invention makes it possible to maximize the diffraction efficiency of the measuring graduation and, on the other hand, also renders possible a homogeneity of the diffraction properties over a relatively large surface area. This becomes increasingly important since indications are that the measuring graduation will require ever greater planar dimensions. There is such a requirement, in particular, when the measuring graduation, respectively the position measuring device equipped therewith, is used in lithographic systems, since, on the one hand, the measuring steps attainable therewith are to become ever smaller and, on the other hand, the increasing size of the wafers will necessitate ever greater measuring path lengths. The homogeneity of the diffraction properties over a relatively large surface area achievable by the present invention and the low fluctuation level of the electrical scanning signals attainable therewith are due to the fact that the minimum of the zero order diffraction coincides with the maximum of the first order diffraction in the embodiment of the grating elements according to an embodiment of the present invention.

The present invention, in an embodiment, also makes it possible to manufacture the measuring graduation in a relatively simple process. The outer contours that form the grating elements do not include any acute angles nor any 90° angles, and there is no mutual contact in either direction of the side-by-side configured outer contours. An electron beam writer having a variable beam shaping aperture (variable shaped beam technology=VSB) may be used to irradiate the photomasks for structures of this kind relatively quickly since the combination of a few shapes in the form of rectangles and/or squares and/or triangles makes the outer contour according to an embodiment of the present invention suited for irradiation.

FIG. 1 shows a plan view of a measuring graduation 1 configured in accordance with the present invention for a photoelectric position measuring device for measuring positions in a first direction X, and in a second direction Y extending orthogonally thereto. The measuring graduation forms a phase grating having a periodic array of grating elements 2 in first direction X and in second direction Y. In accordance with the present invention, grating elements 2 each feature an outer contour that is formed by a continuous line, which includes two mutually opposing first straight edges K1 and two mutually opposing second straight edges K2 extending perpendicularly thereto, as well as connecting lines K3 between first edges K1 and second edges K2, respectively, that form an obtuse angle α, respectively.

Connecting lines K3 advantageously include straight lines. Obtuse angle α between first edge K1 and straight connecting line K3, as well as between second edge K2 and straight connecting line K3 is, in particular, 135° in each case.

Moreover, mutual spacing A1 of first edges K1 is equal to mutual spacing A2 of second edges K2.

An especially advantageous embodiment is a four-axis symmetrical outer contour. The outer contour extends mirror symmetrically to a first axis of symmetry S1 that extends orthogonally to first edges K1 and mirror symmetrically to a second axis of symmetry S2 that extends orthogonally to second edges K2, and mirror symmetrically to a third axis of symmetry S3 that extends at 45° to first axis of symmetry S1, and mirror symmetrically to a fourth axis of symmetry S4 that extends orthogonally to third axis of symmetry S3.

This embodiment has the advantage that the diffraction properties of grating elements 2 are identical in both directions X and Y, and, for that reason, the scanning arrays may be identically configured for both directions X and Y. For one thing, the same spatial conditions are derived for both directions X and Y; this means that, relative to the X-Y plane, the angles of the diffraction orders to be analyzed are identical, and the diffraction orders to be analyzed are also equal in intensity, so that the same evaluation units may be used for both directions X and Y.

These advantageous conditions are obtained, in particular, when first edges K1 are oriented in parallel to a direction Y of the two directions X, Y, and second edges K2 are oriented in parallel to other direction X of the two directions X, Y, or when first edges K1 are angled 45° toward first direction X, and second edges K2 are angled 45° toward second direction Y.

In the illustrated example, the measuring graduation is a reflecting phase grating that is used for measuring positions in what is generally referred to as incident light. Incident light signifies that the phase grating is illuminated from one side, and the light beam incident to the phase grating is reflectively diffracted. Precisely measuring positions requires phase gratings that are designed for suppressing the zero order diffraction as completely as possible. It has been found that selected surface area ratio F of grating elements 2 is a parameter that is suited for this purpose. Grating elements 2 are configured with periodicity P1 in first direction X and with periodicity P2 in second direction Y. Each of grating elements 2 is composed of a first surface area F1 and a second surface area F2. First surface area F1 is formed by the reflecting, raised surface having the mentioned outer contour, and second surface area F2 is formed by the reflecting surface area of grating element 2 surrounded by this outer contour. Surface area ratio F is F1/F2 and is selected to allow the same light intensities to be reflected in each case (directly reflected light without considering diffraction) by an incident light beam. This leads to a quenching of the zero order diffraction in the case of a step height H selected as a function of the wavelength of the light used between reflecting surface F1 and reflecting surface F2 recessed therefrom.

To provide a precise and high-resolution position measurement, the periodicity P1 and P2 is advantageously smaller than 10 μm.

In addition, P1 is, in particular, equal to P2.

Figure 2:
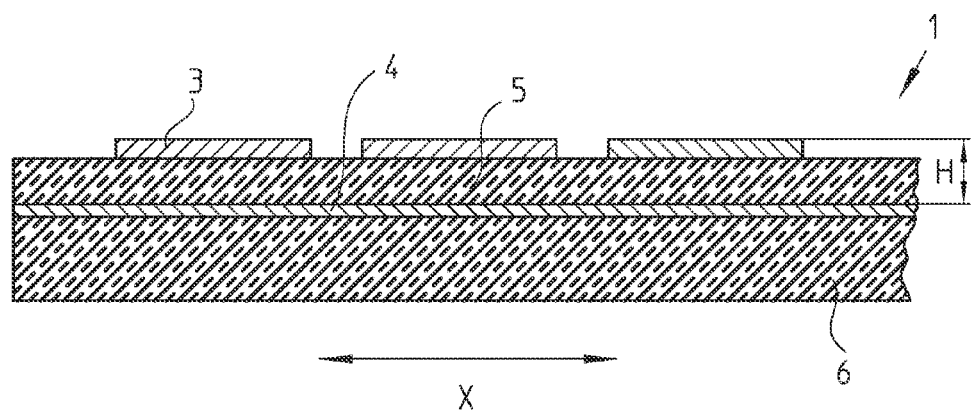
FIG. 2 shows a cross-sectional view taken along II-II of the measuring graduation in accordance with FIG. 1.

FIG. 2 shows a cross-sectional view taken along II-II of the phase grating illustrated in FIG. 1. In this example, step height H of grating elements 2 is formed by two reflective layers 3 and 4 that are mutually spaced apart orthogonally to first and second direction X, Y and are configured on both sides of a transparent spacer layer 5. Along with other parameters, such as refractive index, step height H between patterned layer 3 and layer 4, which is continuous in the example, determines the optical path length difference between the light beam reflected at surface F1 and that being reflected at surface F2.

For a wavelength of the light beam of approximately 980 nm used during scanning, a requisite step height H of approximately 180 nm is derived for quenching the zero order diffraction.

Reflective layers 3, 4, for example, may contain the materials chromium, gold, aluminum and silicon. A glass having an expansion coefficient of nearly zero is preferably used, in particular, ZERODUR or ULE, as supporting material 6 of reflective layer 4. Reflective layer 4 is continuous, thus also configured beneath surfaces F1 or only partially next to surfaces F1.

Silicon-containing materials, such as $SiO_2$, in particular, but also $Ta_2O_5$ are suited as a transparent spacer layer.

Figure 3:
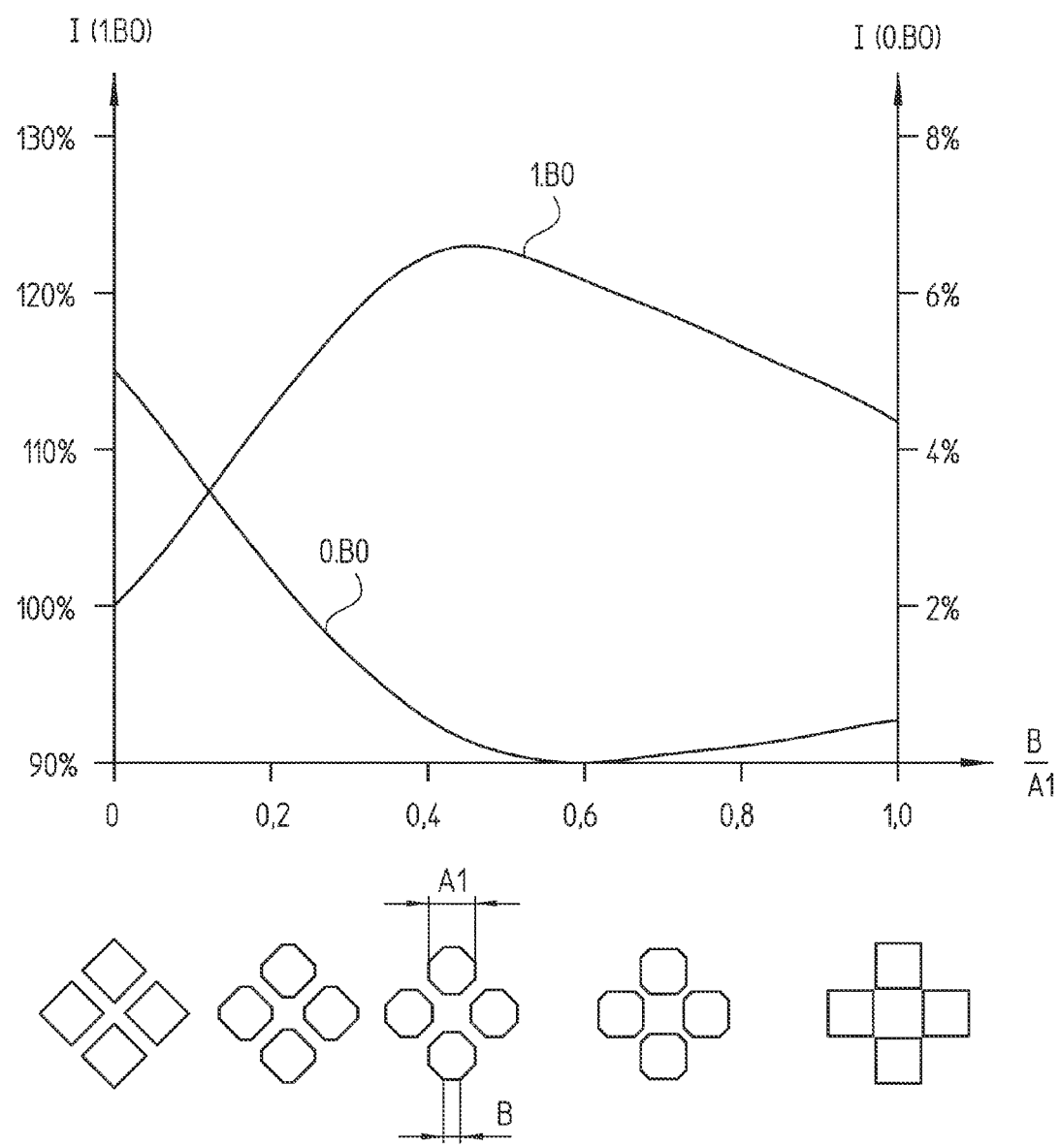
FIG. 3 shows the intensity profiles of the first order diffraction and of the zero order diffraction as a function of the shape of a grating element of the measuring graduation.

FIG. 3 illustrates the intensity profiles of first order diffraction ($1^{st}$ OD) and of zero order diffraction (0 OD), respectively, as a function of the shape of the outer contour that forms grating elements 2. The intensity profiles are plotted as a function of the ratio of length B of second edges K2 to mutual spacing A1 of first edges K1. For a better understanding of ratios B/A1, corresponding grating elements 2 are schematically shown with the outer contours thereof below the numerical values. For the particular outer contour—in each instance, in the context of an optimum surface area ratio F for the corresponding outer contour—FIG. 3 shows maximum intensity I of first order diffraction (1st OD) attainable therewith.

In accordance with the related art set forth by the German Patent DE 4132941 C2, this ratio is B/A1=0 and, in accordance with the European Patent Application EP 1106972 A1, it is B/A1=1. It is readily apparent from FIG. 3 that first diffraction order (1st OD) is at its maximum within a range between these two extremes. In the same way, zero order diffraction (0 OD) is at its minimum between these two extremes. The present invention takes advantage of this new realization.

It is advantageous when length B of second edges K2 is 10% to 90% of mutual spacing A1 of first edges K1, respectively, thus, that ratio B/A1 is selected to be between 0.1 and 0.9. This ratio also holds for the first edges, so that length C of first edges K1 is 10% to 90% of mutual spacing A2 of second edges, respectively, thus ratio C/A2 is likewise between 0.1 and 0.9.

An even better optimization is achieved when length B of second edges K2 is 30% to 70% of mutual spacing A1 of first edges K1, respectively, thus, ratio B/A1 is selected to be between 0.3 and 0.7; as well as length C of first edges K1 is 30% to 70% of mutual spacing A2 of second edges K2, respectively, thus, ratio C/A2 is selected to be between 0.3 and 0.7.

FIG. 4 illustrates the intensity profiles of first order diffraction (1.BO) and of zero order diffraction (0.BO) for a measuring graduation in accordance with the related art (German Patent DE 4132941 C2) and for a measuring graduation in accordance with the present invention as a function of surface area ratio F of a grating element 2. The characteristic curve of zero order diffraction is identical for both represented grating elements. It is readily apparent herefrom that, in the case of the embodiment according to the present invention, advantages are also derived from a production engineering standpoint. Assuming an acceptable reduction of the diffraction efficiency of 10% of the maximally attainable diffraction efficiency, an increase in the intensity of the zero order diffraction of up to 18% results under the related art. In the case of an embodiment according to the present invention, a higher maximum of the first order diffraction results, on the one hand, and, in addition, an increase in the intensity of the zero order diffraction of only up to 6% results when the 10% tolerance window is used. Therefore, the measuring graduation having an inventive design is especially suited for use in highly resolving position measuring devices where the light beam that is modulated as a function of position is obtained by repeated diffraction (use of the first order diffractions each time) at the measuring graduation.

Underlying the curve shapes in FIGS. 3 and 4 is a layered structure in accordance with FIG. 2 where the reflectivity of surface area F1 is somewhat greater than that of surface area F2. Therefore, the minimum of the zero order diffraction lies within a region of F<0.5. In the case of the structure illustrated in FIG. 2, this actual situation is attributed to the fact that reflecting layer 4 is covered with transparent layer 5, and thus that light reflected by layer 4 is attenuated by layer 5.

The measuring graduation designed in accordance with the present invention may also be used for measuring a position perpendicularly to the X-Y plane, in which regard, reference is made to the European Patent Application EP 1762828 A2, which is hereby incorporated by reference herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A measuring graduation for a photoelectric position measuring device for measuring positions in a first direction and in a second direction extending orthogonally to the first direction, the measuring graduation comprising:
a phase grating having a periodic array of grating elements in the first direction and in the second direction, wherein the grating elements each have an outer contour that is formed by a continuous line which includes two mutually opposing first straight edges, two mutually opposing second straight edges extending perpendicularly to the first straight edges, and connecting lines extending between the first straight edges and the second straight edges, the connecting lines forming an obtuse angle with the first straight edges and with the second straight edges,
wherein the grating elements each comprise a first area percentage and a second area percentage, the first area percentage being a reflecting surface area having the outer contour, and the second area percentage being a reflecting surface area surrounding the first area percentage, and wherein the first area percentage is raised or recessed relative to the second area percentage, and wherein the first area percentage and the second area percentage are configured to allow same light intensities to be reflected.

2. The measuring graduation as recited in claim 1, wherein the connecting lines are straight lines and the obtuse angle is 135°.

3. The measuring graduation as recited in claim 1, wherein a mutual spacing of the first straight edges corresponds to a mutual spacing of the second straight edges.

4. The measuring graduation as recited in claim 3, wherein the outer contour extends:
mirror symmetrically to a first axis of symmetry that extends orthogonally to the first straight edges;
mirror symmetrically to a second axis of symmetry that extends orthogonally to the second straight edges;
mirror symmetrically to a third axis of symmetry that extends at 45° to the first axis of symmetry; and
mirror symmetrically to a fourth axis of symmetry that extends orthogonally to the third axis of symmetry.

5. The measuring graduation as recited in claim 1, wherein a length of each of the second straight edges is 10% to 90% of a mutual spacing of the first straight edges and a length of each of the first straight edges is 10% to 90% of a mutual spacing of the second straight edges.

6. The measuring graduation as recited in claim 5, wherein the length of each of the second straight edges is 30% to 70% of the mutual spacing of the first straight edges and the length of each of the first edges is 30% to 70% of the mutual spacing of the first straight edges.

7. The measuring graduation as recited in claim 1, wherein the first straight edges are oriented in parallel to the first direction and the second straight edges are oriented in parallel to the second direction.

8. The measuring graduation as recited in claim 1, wherein the first straight edges are angled 45° toward the first direction and the second edges are angled 45° toward the second direction.

9. The measuring graduation as recited in claim 1, wherein the phase grating is configured to suppress a zero order diffraction.

10. The measuring graduation as recited in claim 1, wherein the phase grating includes two reflective layers that are mutually spaced apart orthogonally to the first direction and the second direction, one of the two reflective layers being disposed on each side of a transparent spacer layer.

11. A photoelectric position measuring device having a measuring graduation in accordance with claim 1.

* * * * *